United States Patent [19]
Moon

[11] Patent Number: 6,091,769
[45] Date of Patent: Jul. 18, 2000

[54] VIDEO DECODER HAVING AN INTERFACING FUNCTION FOR PICTURE SYNCHRONIZATION

[75] Inventor: Heon-Hee Moon, Suwon, Rep. of Korea

[73] Assignee: Samsung Electronics Co., Ltd., Kanagawa, Japan

[21] Appl. No.: 08/872,734

[22] Filed: Jun. 11, 1997

[30] Foreign Application Priority Data

Jun. 11, 1996 [KR] Rep. of Korea ................. 96-20792

[51] Int. Cl.[7] ................................................. H04N 7/24
[52] U.S. Cl. .................... 375/240; 348/845.2; 348/845.3
[58] Field of Search ........................ 348/390, 409–412, 348/423, 426, 465, 512, 845, 845.1, 845.2, 845.3; 370/474; 395/559; 375/240; H04N 7/24

[56] References Cited

U.S. PATENT DOCUMENTS

| | | | |
|---|---|---|---|
| 5,396,497 | 3/1995 | Veltman | 348/423 |
| 5,517,250 | 5/1996 | Hoogenboom et al. | 348/390 |
| 5,521,927 | 5/1996 | Kim et al. | 348/423 |
| 5,598,415 | 1/1997 | Nuber et al. | 348/465 |
| 5,726,989 | 3/1998 | Dokic | 348/423 |
| 5,801,781 | 9/1998 | Hiroshima et al. | 348/426 |
| 5,812,976 | 9/1998 | Ryan | 370/474 |
| 5,832,256 | 11/1998 | Kim | 395/559 |
| 5,886,736 | 3/1999 | Chen | 348/845.2 |
| 5,898,695 | 4/1999 | Fujii et al. | 348/423 |
| 5,960,006 | 9/1999 | Maturi et al. | 348/512 |

*Primary Examiner*—Richard Lee
*Attorney, Agent, or Firm*—Sughrue, Mion, Zinn, Macpeak & Seas, PLLC

[57] ABSTRACT

A video decoder has an interfacing function for picture synchronization which can synchronize a decoding and display operation in units the size of a picture. The video decoder includes a transport stream (TS) demultiplexer and an interfacer. The TS demultiplexer is a packet separator for separating packetized elementary stream (PES) packet data of a desired program from a received transport stream (TS). The interfacer has an input buffer for receiving and storing the PES packet data, a PES filter for extracting the encoded video data from the PES packet data stored in the input buffer, a presentation time stamp (PTS) and decoding time stamp (DTS) extractor for extracting the time stamp information of the PTS and DTS contained in the PES packet data stored in the input buffer, a picture start code (PSC) detector for detecting the PSC contained in the PES packet data stored in the input buffer, and a multiplexer for multiplexing the time stamp information extracted from the PTS/DTS extractor with the corresponding picture start code of the encoded video data output from the PES filter, based on the PSC detected in the PSC detector, and outputting the multiplexed result. Thus, the time stamp information can be decoded together with the bit steam video data, to thereby facilitate synchronization of a picture unit and enable normal decoding and display.

17 Claims, 3 Drawing Sheets

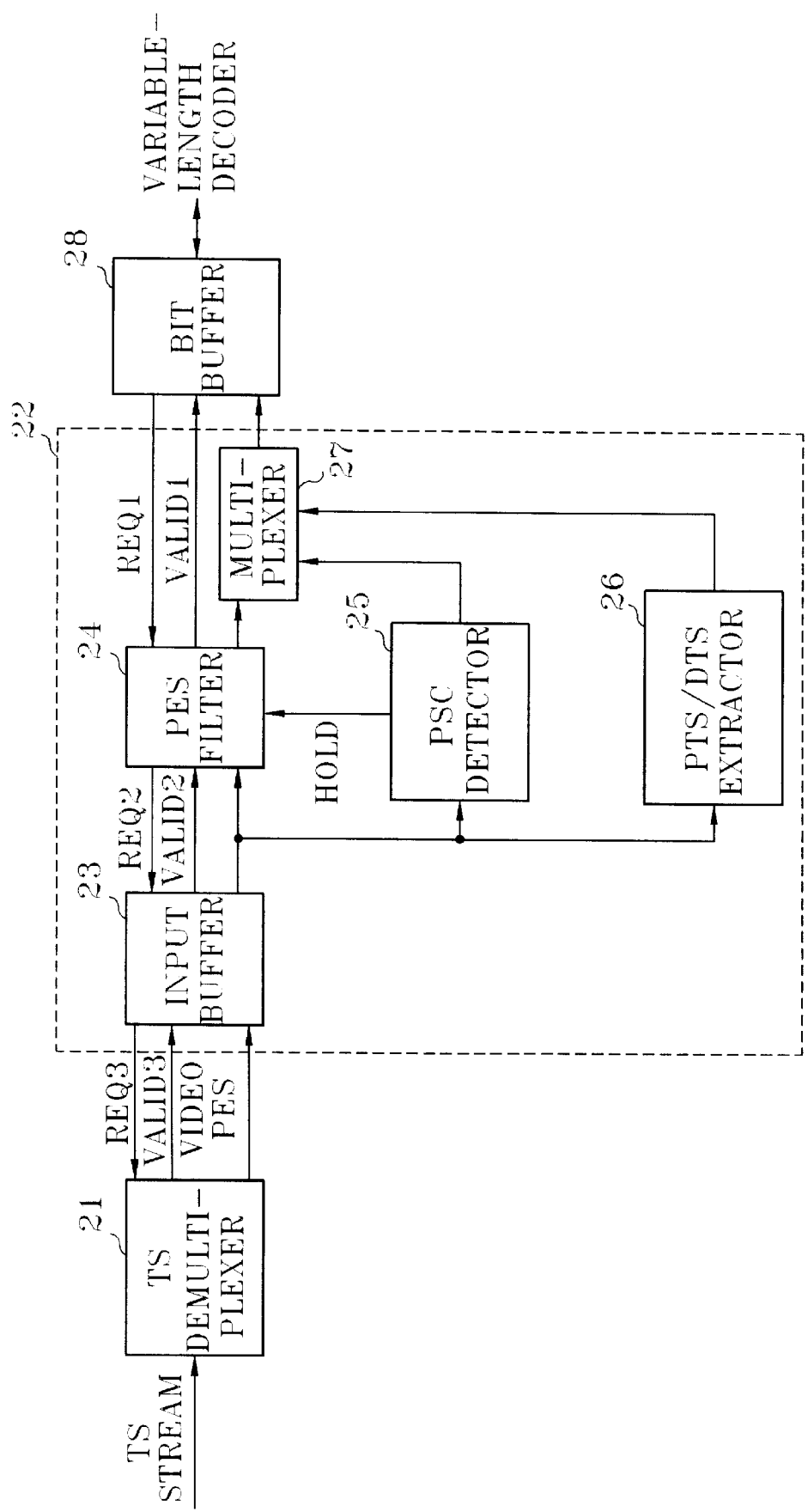

VIDEO DECODER HAVING AN INTERFACING FUNCTION FOR PICTURE SYNCHRONIZATION

BACKGROUND OF THE INVENTION

1. Field of the Invention

The present invention relates to a video decoder for restoring video data of an encoded and multiplexed bit stream, and more particularly, to a video decoder having an interfacing function for picture synchronization which can synchronize a decoding and display operation in units of a picture to precisely control the video decoder. The present application is based on Korean Patent Application No. 96-20792, which is incorporated herein by reference.

2. Description of the Related Art

The MPEG-II standard for motion picture compression presents the standard for a high-definition television. A video decoder adopting the standard decodes and displays video data among transport stream (TS) data obtained by multiplexing video data and audio data encoded in the form of each bit stream with respect to a plurality of programs. The TS stream includes video data encoded in units the size of a picture, a picture start code (PSC) indicating a picture start, and time stamp information, in the form of a packetized elementary stream (PES) packet. The PES is defined in the system standard DIS 13818-1 in the MPEG-II standard in order to packetize and multiplex video data encoded in the bit stream form in units of a constant length or variable length packet. The time stamp information relates to the decoding time and reproducing output time, which includes decoding time stamp (DTS) and presentation time stamp (PTS) information, respectively. The PTS and DTS information is contained in the PES packet header, and may not be transferred for every picture. When a transfer is made, the PTS and DTS information is transferred with respect to an intra-coded I-picture and a predictive-coded P-picture. Only the PTS is transferred with respect to a bidirectionally predictive-coded B-picture since the PTS and the DTS are the same. The video decoder decodes the PTS and DTS information to thereby perform a control operation in units the size of a picture. The PTS represents the time for displaying the decoded picture and the DTS represents the start time for decoding a bit stream. Thus, a normal operation of the video decoder can assuredly prevent decoding and display operations from temporally leading and lagging using the DTS and PTS whenever the picture is decoded and displayed.

FIG. 1 is a block diagram showing a general video decoder. The general video decoder receives the TS stream transmitted via a channel. A TS demultiplexer 11 separates the video data and the time stamp information encoded in the bit stream form, corresponding to a program selected by a user, from the received TS stream and outputs the separated result. A bit buffer 12 stores the video data encoded in the bit stream form which has been separated by the TS demultiplexer 11. A time stamp buffer 13 stores the time stamp information which has been separated by the TS demultiplexer 11. The bit buffer 12 outputs the stored video data encoded in the bit stream form whenever a variable-length decoder 14 requests data. At the same time, the time stamp buffer 13 outputs the time stamp information corresponding to the video data output from the bit buffer 12. Accordingly, the timing of the decoding and display operations of the output video data is synchronized in units the size of a picture.

The variable-length decoder 14 decodes the time stamp information output from the time stamp buffer 13 to obtain the PTS and DTS information, outputs the PTS information to a display (not shown), and performs a variable-length-decoding operation with respect to the encoded video data output from the bit buffer 12 using the DTS information. An inverse quantizer 15 and an inverse discrete cosine transformer (IDCT) 16 inversely quantizes and inversely discrete cosine transforms the variable-length-decoded video data. The data output from the IDCT 16 is supplied to an adder 17. A frame memory 18 stores the video data output from the adder 17. A motion compensator 19 performs a motion compensation operation with respect to the video data stored in the frame memory 19 using a transmitted motion vector (not shown). The adder 17 adds the inversely quantized and inverse discrete cosine transformed data and the video data motion-compensated in the motion compensator 19. The video data output from the adder 17 is restored video data, and is both output to the display and stored in the frame memory 18. The display starts a display operation of the corresponding restored video data using the PTS information obtained from the variable-length decoder 14.

However, the above video decoder stores the bit stream video data and the time stamp information in different buffers and reads the same therefrom. Thus, when the time stamp information is used for decoding and display operation control of the bit stream video data of the corresponding picture, synchronization may be lost. Furthermore, it is difficult to effectively use the time stamp information for decoding and display operation control when errors occur, which causes difficulty in reproducing a normal picture.

SUMMARY OF THE INVENTION

To solve the above problems, it is an object of the present invention to provide a video decoder having an interfacing function for picture synchronization which multiplexes time stamp information with a corresponding picture start code and store the multiplexed result together with the encoded video data of the picture in a bit buffer to thereby maintain synchronization with the time stamp information for every picture, without separately processing the encoded video data and the time stamp information.

To accomplish the above object of the present invention, there is provided a video decoder having an interfacing function for picture synchronization, the video decoder comprising: packet separation means for separating packetized elementary stream (PES) packet data of a desired program from a received transport stream (TS); interfacing means for receiving the PES packet data output from the packet separation means, and outputting time stamp information and encoded video data contained in the PES packet data; and decoding means for receiving the data output from the interfacing means, decoding the encoded video data using the time stamp information and displaying the decoded video data via a display.

BRIEF DESCRIPTION OF THE DRAWINGS

The preferred embodiments are described with reference to the drawings wherein:

FIG. 2 is a block diagram showing part of a video decoder to which the present invention is adapted.

DETAILED DESCRIPTION OF THE PREFERRED EMBODIMENT

A preferred embodiment of the present invention will be described in detail with reference to the accompanying drawings.

Figure 1:
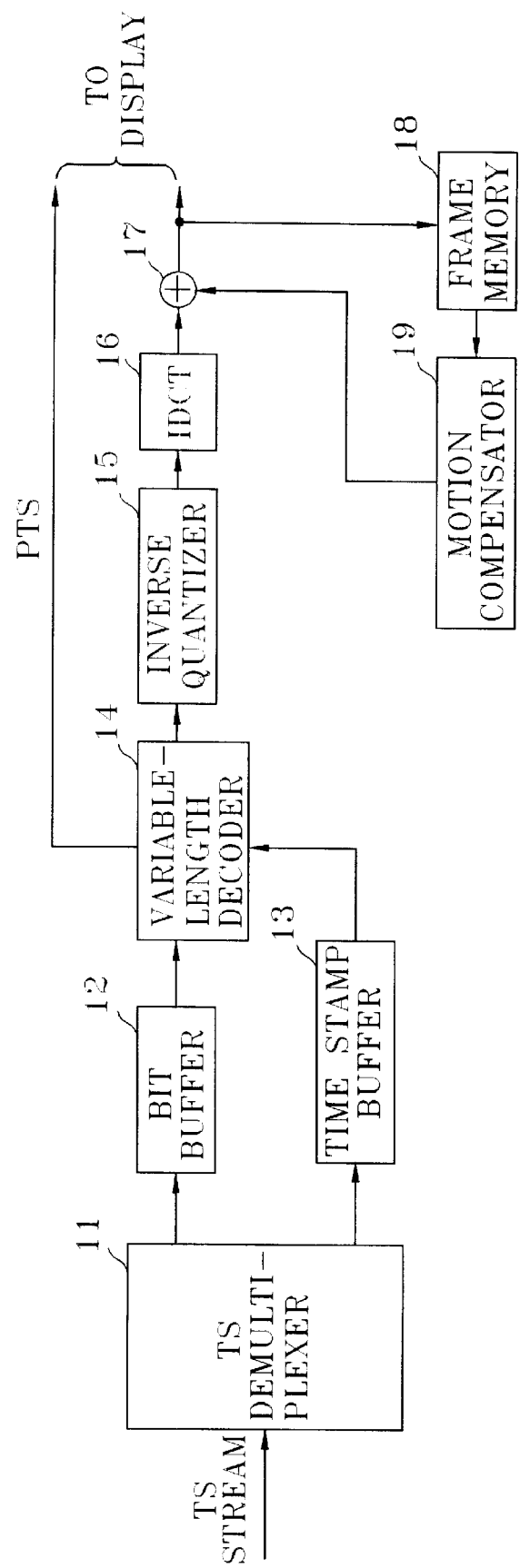
FIG. 1 is a block diagram showing a general video decoder.

In FIG. 2, showing part of a video decoder to which the present invention is adapted, the time stamp buffer 13 of the FIG. 1 video decoder is replaced by a TS demultiplexer 21 which is a packet separator for separating and outputting the PES packet data of a desired program from the received TS stream. Also, an interfacer 22 is additionally connected between the TS demultiplexer 21 and a bit buffer 28. The interfacer 22 stores the PTS and DTS time stamp information together with the bit stream video data of a corresponding picture in the bit buffer 28. An input buffer 23 in the interfacer 22 receives and stores the data in the PES packet form from the TS demultiplexer 21. A PES filter 24 outputs the encoded video data in the bit stream form contained in the PES packet data stored in the input buffer 23. A PSC detector 25 detects a picture start code (PSC) from the PES packet data stored in the input buffer 23. A PTS/DTS extractor 26 extracts the PTS and DTS information from the PES packet data stored in the input buffer 23. A multiplexer 27 multiplexes the PSC detected by the PSC detector 25 and the PTS and DTS information extracted by the PTS/DTS extractor 26, and outputs the multiplexed result to the bit buffer 28.

The bit buffer 28 outputs the stored bit stream data whenever the variable-length decoder requests data. The bit buffer 28 requests the data from the TS demultiplexer 21 via the interfacer 22 until the bit buffer 28 is full of the stored data. The TS demultiplexer 21 receives the TS stream which is encoded and multiplexed of a plurality of programs transmitted via a channel. The TS demultiplexer 21 outputs video packet data VIDEO PES corresponding to a program selected by a user from the received TS stream according to a data request signal REQ3 of the input buffer 23. The input buffer 23 generates the data request signal REQ3 for the TS demultiplexer 21 until it is full of stored data. The TS demultiplexer 21 outputs the video packet data VIDEO PES of the selected program to the input buffer 23 together with a data valid signal VALID3, if the data request signal REQ3 is applied from the input buffer 23. The input buffer 23 stores the video packet data VIDEO PES output from the TS demultiplexer 21 together with a data valid signal VALID3.

The PES filter 24 generates a data request signal REQ2 applied to the input buffer 23, if a data request signal REQ1 is input from the bit buffer 28. The input buffer 23 outputs the stored video packet data VIDEO PES together with the data valid signal VALID2 to the PES filter 24 in response to the data request signal REQ2 of the PES filter 24. The video packet data output from the input buffer 23 is input to the PSC detector 25 and the PTS/DTS extractor 26, as well as the PES filter 24. The PES filter 24 extracts the encoded video data from the video packet data input together with the data valid signal VALID2 from the input buffer 23 and outputs the extracted result to the multiplexer 27. Therefore, the PES packet header information contained in the video packet data VIDEO PES is not supplied to the multiplexer 27. The PTS/DTS extractor 26 extracts the PTS and DTS from the video packet data applied from the input buffer 23 and outputs the extracted result to the multiplexer 27. The multiplexer 27 maintains the PTS and DTS extracted from the PTS/DTS extractor 26 until the PSC detector 25 detects the picture start code PSC. The PSC detector 25 detects the picture start code (PSC) from the video packet data received from the input buffer 23. The picture start code PSC is expressed as 32 bits, among which the upper 24 bits are fixed as "0000 0000 0000 0000 0000 0001." The PSC detector 25 supplies the detected picture start code PSC to the multiplexer 27 and applies a hold signal HOLD to the PES filter 24 if the picture start code PSC is detected. The PES filter 24 stops a data read operation from the input buffer 23 if the hold signal HOLD is applied thereto. The multiplexer 27 multiplexes the PTS and DTS information extracted in the PTS/DTS extractor 26 with a corresponding picture start code of encoded video data output from the PES filter 24, based on the picture start code PSC detected in the PSC detector 25, and outputs the multiplexed result. In this connection, the multiplexing will be described below with reference to FIGS. 3A through 3C.

Figure 3A:
FIGS. 3A through 3C are views for explaining a multiplexing method of the FIG. 2 multiplexer.
Figure 3B:
Figure 3C:
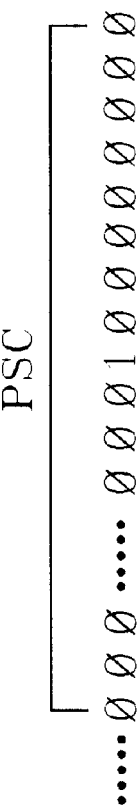

FIGS. 3A through 3C are views for explaining a multiplexing method of the FIG. 2 mutliplexer 27. FIG. 3A shows a case when the PTS and DTS information is completely extracted. Here, the multiplexer 27 multiplexes the uppermost 24 bits $00001_{16}$, an identification code ID1, PTS information, an identification code ID2 and DTS information in sequential turn among 32 bits of the detected picture start code PSC. FIG. 3B shows a case when only the PTS information is extracted. Here, the multiplexer 27 multiplexes the uppermost 24 bits, an identification code ID1 and the PTS information of the picture start code PSC in sequential turn. FIG. 3C shows a case when both PTS and DTS information are not extracted. In this case, the picture start code PSC is output directly to the bit buffer 28. Here, the identification code ID1 is for identification of the PTS information and the identification code ID2 is for identification of the DTS information.

Meanwhile, the bit buffer 28 disables the data request in the case when the data storage is in an overflow state, to prevent the input buffer 23 from storing the data.

The time stamp information of the PTS and DTS stored in multiplexed form in the bit buffer 28 and the start code of the corresponding picture are used for variable-length-decoding the video data in the variable-length decoder. The variable-length decoder uses the DTS information to start decoding a corresponding picture and uses the PTS information to start displaying the decoded picture.

As described above, the video decoder according to the present invention multiplexes the time stamp information of the PTS and the DTS with the picture start code PSC whenever the picture start code is detected and stores the same in the bit buffer 28. Thus, the time stamp information can be decoded together with the bit steam video data, to facilitate synchronization of a picture unit and enable normal decoding and display.

While only certain embodiments of the invention have been specifically described herein, it will apparent that numerous modifications may be made thereto without departing from the spirit and scope of the invention.

What is claimed is:

1. A video decoder having an interfacing function for picture synchronization, the video decoder comprising:

packet separation means for separating packetized elementary stream (PES) packet data of a desired program from a received transport stream (TS), and outputting the PES packet data;

interfacing means for receiving the PES packet data output from the packet separation means, and outputting time stamp information and encoded video data contained in the PES packet data; and decoding means for receiving the data output from the interfacing means, decoding the encoded video data using the time stamp information and displaying the decoded video data;

wherein said interfacing means multiplexes the extracted time stamp information with a start code of a corresponding picture and outputs the encoded video data in units a size of a picture and in a bit stream form.

2. The video decoder according to claim 1, further comprising storage means coupled between said interfacing means and said decoding means, for receiving the output data of said interfacing means and storing the received data.

3. A video decoder having an interfacing function for picture synchronization, the video decoder, comprising:

packet separation means for separating packetized elementary stream (PES) packet data of a desired program from a received transport stream (TS), and outputting the PES packet data;

interfacing means for receiving the PES packet data output from the packet separation means, and outputting time stamp information and encoded video data contained in the PES packet data; and decoding means for receiving the data output from the interfacing means, decoding the encoded video data using the time stamp information and displaying the decoded video data;

wherein said interfacing means comprises:

an input buffer for storing the PES packet data received from said packet separation means;

a PES filter for extracting the encoded video data from the PES packet data stored in said input buffer; and multiplexing means for extracting the time stamp information contained in the PES packet data stored in said input buffer, multiplexing the extracted time stamp information with the corresponding encoded video data extracted by the PES filter, and outputting the multiplexed result to said decoding means.

4. The video decoder according to claim 3, further comprising storage means coupled between said interfacing means and said decoding means, for receiving the output data of said interfacing means and storing the received data.

5. The video decoder according to claim 3, wherein said multiplexing means comprises:

a time stamp extractor for extracting the time stamp information contained in the PES packet data stored in said input buffer;

a picture start code (PSC) detector for detecting a picture start code PSC of the encoded video data contained in the PES packet data stored in said input buffer; and a multiplexer for multiplexing the time stamp information extracted from said time stamp extractor with the corresponding picture start code of the encoded video data output from said PES filter, based on the picture start code PSC detected in the PSC detector, and outputting the multiplexed result.

6. The video decoder according to claim 5, wherein said multiplexer multiplexes the picture start code and the time stamp information to be adjacent to each other.

7. The video decoder according to claim 6, wherein said multiplexer multiplexes the time stamp information with a corresponding identification code following an uppermost 24 bits of the PSC.

8. The video decoder according to claim 7, wherein said time stamp information includes a presentation time stamp (PTS) and a decoding time stamp (DTS).

9. The video decoder according to claim 8, wherein said decoding means uses the DTS information obtained by decoding the output data of said multiplexer, to start a decoding operation of the encoded video data in units of a corresponding picture and uses the PTS information to start displaying the decoded video data in a unit of a picture.

10. A video decoder having an interfacing function for picture synchronization, the video decoder comprising:

a packet separator operative to separate packetized elementary stream (PES) packet data of a desired program from a received transport stream (TS), and output the PES packet data;

an interface operative to receive the PES packet data output from the packet separator, and output time stamp information and encoded video data contained in the PES packet data; and a decoder operative to receive the data output from the interface and decode the encoded video data using the time stamp information;

wherein said interface is further operative to multiplex the extracted time stamp information with a start code of a corresponding picture and output the encoded video data in units a size of a picture and in a bit stream form.

11. The video decoder according to claim 10, further comprising a memory coupled between said interface and said decoder, operative to receive the output data of said interface and store the received data.

12. A video decoder having an interfacing function for picture synchronization, the video decoder comprising:

a packet separator operative to separate packetized elementary stream (PES) packet data of a desired program from a received transport stream (TS), and output the PES packet data;

an interface operative to receive the PES packet data output from the packet separator, and output time stamp information and encoded video data contained in the PES packet data; and a decoder operative to receive the data output from the interface and decode the encoded video data using the time stamp information;

wherein said interface comprises:

an input buffer for storing the PES packet data received from said packet separator;

a PES filter for extracting the encoded video data from the PES packet data stored in said input buffer; and a multiplexer operative to extract the time stamp information contained in the PES packet data stored in said input buffer, multiplex the extracted time stamp information with the corresponding encoded video data extracted by the PES filter, and output the multiplexed result to said decoder.

13. The video decoder according to claim 12, wherein said multiplexer comprises:

a time stamp extractor operative to extract the time stamp information contained in the PES packet data stored in said input buffer;

a picture start code (PSC) detector for detecting a picture start code PSC of the encoded video data contained in the PES packet data stored in said input buffer; and a multiplexer operative to multiplex the time stamp information extracted from said time stamp extractor with the corresponding picture start code of the encoded video data output from said PES filter, based on the picture start code PSC detected in the PSC detector, and output the multiplexed result.

14. The video decoder according to claim 13, wherein said multiplexer multiplexes the picture start code and the time stamp information to be adjacent to each other.

15. The video decoder according to claim 14, wherein said multiplexer multiplexes the time stamp information with a corresponding identification code following an uppermost 24 bits of the PSC.

16. The video decoder according to claim 15, wherein said time stamp information includes a presentation time stamp (PTS) and a decoding time stamp (DTS).

17. The video decoder according to claim 16, wherein said decoder uses the DTS information, obtained by decoding the output data of said multiplexer, to start a decoding operation of the encoded video data in units of a corresponding picture and uses the PTS information to start displaying the decoded video data in a unit of a picture.

* * * * *